Sept. 5, 1950 F. B. WILLIAMS ET AL 2,520,987
VEHICLE BODY ANTENNA
Filed Oct. 22, 1947
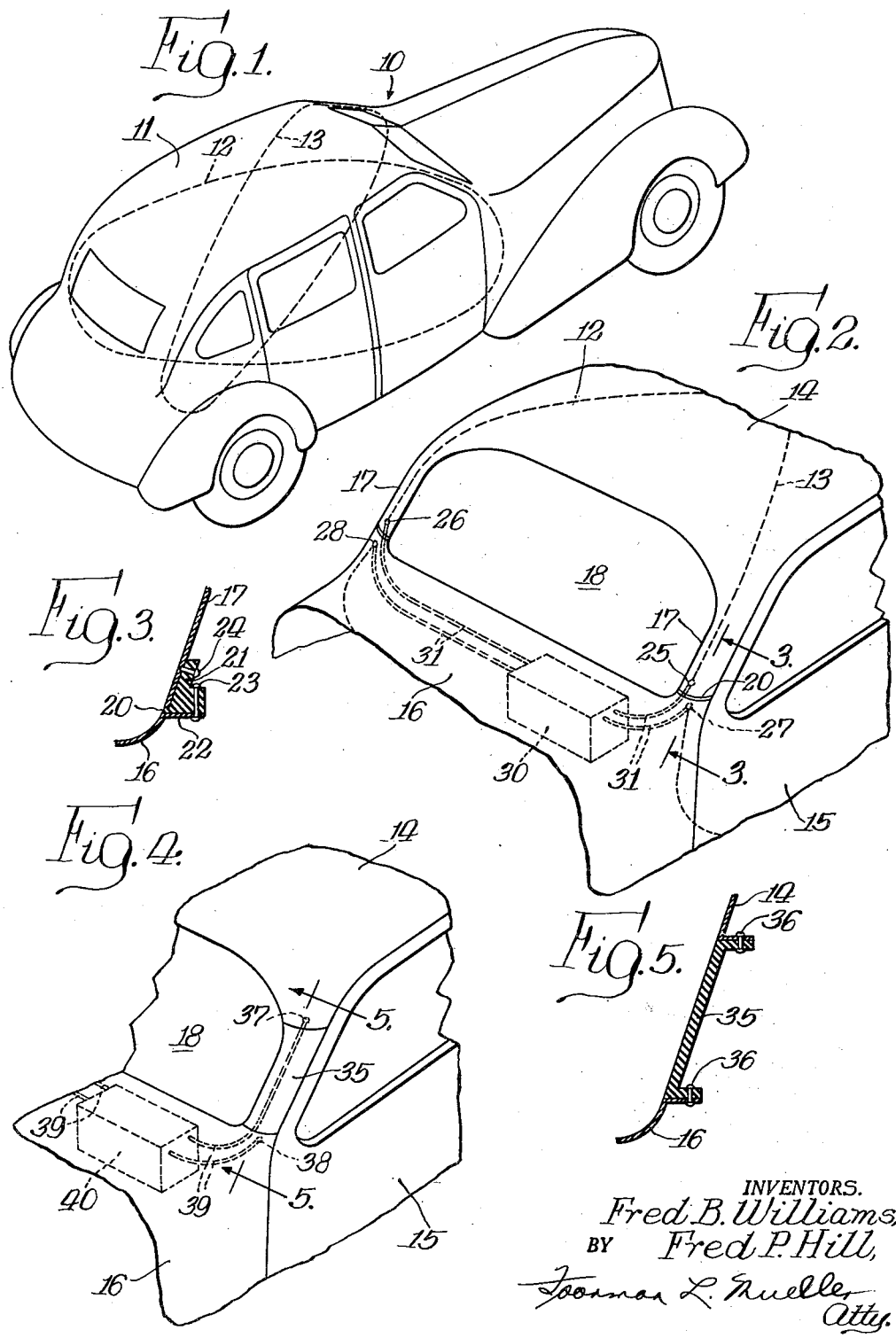
INVENTORS.
Fred B. Williams,
BY Fred P. Hill,
Toorman L. Mueller
Atty.

Patented Sept. 5, 1950

2,520,987

UNITED STATES PATENT OFFICE 2,520,987

VEHICLE BODY ANTENNA

Fred B. Williams, Lincolnwood, and Fred P. Hill, Franklin Park, Ill., assignors to Motorola, Inc., Chicago, Ill., a corporation of Illinois Application October 22, 1947, Serial No. 781,283

10 Claims. (Cl. 250—33)

This invention relates generally to antenna systems for wave signal devices and more particularly to the use of the conducting body of a vehicle as an antenna for a wave signal device carried by the vehicle.

Various attempts have been made in the past to provide suitable antennas for use with radio receivers or transmitters installed in mobile vehicles such as automobiles or airplanes. In providing an antenna for such mobile use, it is desired that the antenna be as small and rugged as possible, that it does not adversely affect the appearance of the vehicle, and that it is not subject to interference from the motor of the vehicle. Many of the presently used antennas are objectionable in that they are relatively complicated and expensive and difficult to install and in some cases the installation requires objectionable defacing of the vehicle.

In order to overcome the above difficulties, various solutions have been proposed including attempts to use a part of the automobile itself as an antenna. These attempts have been generally discarded as the signal pickup has not been adequate when used with a receiver, the interference caused by motor noise has been objectionable, and the antennas have generally had undesirable directional characteristics.

Considering the above, it is apparent that a satisfactory antenna for use with mobile vehicles must be inexpensive and capable of being installed without defacing the vehicle, must provide a strong signal when used with a receiver or efficient radiation when used with a transmitter, must not be directional, and must not be affected by adjacent bodies such as viaducts and the like. In our copending application, subject "Antenna System," Serial No. 724,436, filed January 25, 1947, we have disclosed and claimed an antenna system in which the body of the vehicle is used as the signal pickup means. The present application is an improvement of our previous invention and has for an object the provision of an antenna using the body of a vehicle in which greater signal strength is obtained when the antenna is used with a receiver and stronger radiation is produced when the antenna is used with a transmitter.

A further object of the invention is to provide a body for a vehicle in which radio apparatus is installed which is constructed so that a pair of spaced open loops are formed thereby.

A feature of this invention is the provision of a vehicle body having insulating sections therein so that open conducting loops are formed which may be used as loop antennas for wave signal devices.

A further feature of this invention is the provision of an automobile body having insulating sections in the roof supports on either side of the windshield thereof so that two open loops are formed in the body with the loops extending in planes which are disposed at a substantial angle with respect to each other.

Further objects, features and advantages of the invention will be apparent from a consideration of the following description taken in connection with the accompanying drawings in which:

Fig. 1 illustrates the manner in which effective loop circuits are formed in the body of a vehicle;

Fig. 2 illustrates the provision of insulating sections in the vehicle body in accordance with the invention;

Fig. 3 is a cross-sectional view along the lines 3—3 of Fig. 2;

Fig. 4 shows a modified arrangement in which the roof supports of an automobile are made of insulating material; and Fig. 5 is a cross-sectional view along the lines 5—5 of Fig. 4.

In practicing the invention we utilize loop circuits which are inherently formed in the metal body of a vehicle as loop antennas for a wave signal device. Although a great number of different loops are formed in a three dimensional conducting body as provided for vehicles, we have found that in particular, two large loops are formed, the planes of which are disposed at a substantial angle with respect to each other permitting the signal from the loops to be combined to provide a non-directional response. As these loop circuits extend through the roof supports for the top of the vehicle, the circuits through these loops can be opened by providing insulating sections in the roof supports. Connections may then be made to the body adjacent the insulating sections so that the open loop circuits are connected directly to the wave signal device. When used as a receiving antenna, all the signal current flowing through the loop circuit is applied to the receiver, and when used as a transmitting antenna, all the output of the transmitter is applied to the loop circuit to be radiated thereby.

Referring now particularly to Fig. 1, there is disclosed an automobile 10 having a metallic body 11. Although the invention is illustrated and described in connection with a receiver installed in an automobile, it is apparent that any other vehicle might be used, and the body of such vehicle would be completely equivalent to the automobile body. Also, it is apparent that the loop antennas formed are entirely suitable for use with transmitters. Such a vehicle body forms a great number of loops in which radio frequency signals would be induced. In order to provide a satisfactory antenna, however, it is desired that maximum signal pickup be provided and the directional characteristics of the antenna be as uniform as possible. We have found that loop circuits extending diagonally over the top of the vehicle, down the roof supports adjacent the windshield, across the lower frame structure and up at the sides of the rear window provide loops of maximum pickup and also loops which are so disposed with respect to each other that the signal therefrom can be combined to provide a substantially non-directional antenna pattern. The loop circuits above described are illustrated by the dotted lines 12 and 13 in Fig. 1. In our copending application referred to above, we have disclosed one method of utilizing the loop circuits thus formed in the vehicle body. Means for inductively coupling to the loop circuits formed in the vehicle body are disclosed in our copending application Serial No. 781,281, subject, Vehicular Antenna System, filed of even date herewith. The present invention is directed to still another method of utilizing the signal induced in effective loop circuits formed in the vehicle body, being particularly directed to means for obtaining maximum signal therefrom.

Fig. 2 is a partial front view of the automobile 10 illustrating the metal body 11 as including a top 14, doors 15 and a motor hood 16. For supporting the top 14, roof supports 17 are provided on either side of the windshield 18. As previously stated the loop circuits formed in the vehicle body pass through these roof supports so that by providing insulated sections in the roof supports these circuits can be opened and the signal induced in the circuits picked up adjacent these sections. These insulated sections are designated in Fig. 2 as 20 and are shown more in detail in Fig. 3. Although it is obvious that the insulated section may be provided in many different ways, one example of a simple means for providing this structure is illustrated in Fig. 3. As illustrated in this figure, the roof supports 17 and the hood 16 are connected together by insulating members 21 which may be formed of any insulating material such as plastic, wood or hard rubber. The hood may include an extending portion 22 which is secured to the insulating member 21 by any suitable means such as rivets 23. Additional rivets 24 may be used to secure the roof support 17 to the insulating member 21. Although the insulating section may be provided at any position in the roof support 17, the position at the bottom of the windshield as illustrated in Fig. 2 is believed to be particularly practicable as the roof support is normally welded to the hood at this point and the increase in cost of providing an insulated connection is less than to provide an insulated section at any other place in the support.

For connecting the antenna formed by the vehicle body to a wave signal device 30, terminals 25 and 26 are provided in the roof support and terminals 27 and 28 are provided in the hood adjacent the insulated sections 20. Terminals 25 and 27 connect the loop circuit 13 and terminals 26 and 28 connect the loop circuit 12, with the circuits being individually connected to the wave signal device 30 through leads 31 as illustrated. Systems for connecting the antenna loop circuits to wave signal devices are described and claimed in our application Serial No. 724,436 referred to above and in the application of Fred B. Williams, Fred P. Hill and William Blinoff, subject: "Antenna Coupling Circuits," Serial No. 781,282, filed October 22, 1947 of even date herewith.

In Figs. 4 and 5 a modified construction is shown in which roof supports 35 made entirely of insulating material are illustrated. It is obvious that the manufacture of the top 14 of the automobile body would be considerably simplified by elimination of the roof supports as a component part thereof. This is accomplished in the structure shown in Figs. 4 and 5 in which insulating roof supports 35 are connected to the top 14 of the car body and to the hood 16 thereof. The insulating supports are secured to the metal parts of the car body by any suitable means such as rivets 36. Terminals 37 and 38 are then provided on the top and hood of the car so that the car body forms open loops as previously described. These terminals, as well as similar terminals on the other side of the car (not shown), are connected by leads 39 to wave signal device 40 in exactly the same manner as in Fig. 2.

Although certain examples of the manner in which the insulating sections may be provided in a vehicle have been described, it is obvious that there are many other ways in which this result can be accomplished, the way best suited to a particular vehicle depending upon the particular design of the vehicle. In some instances it may be possible to provide for an open loop in a vehicle body in the original design of the body without the use of an insulated support section. By connecting the radio device directly across an insulated section, all the current picked up in the loop formed in the body is applied to a receiver, or when used as a transmitter all the output of the transmitter is fed to the effective part of the loop. Therefore, a very efficient method of utilizing the effective loop circuits formed in a vehicle body as an antenna for a wave signal device installed in the vehicle is provided.

While we have illustrated certain forms in which the invention may be embodied, it is obvious that various changes and modifications can be made therein without departing from the intended scope of the invention as defined in the appended claims.

We claim:

1. In a vehicle having a wave signal device installed therein, a body for said vehicle made of conducting material, at least a portion of said body being of such configuration that a pair of effective loop circuits respectively disposed in intersecting planes displaced from each other by a substantial angle are formed therein, insulating sections in said body so placed to provide openings in said loop circuits, said insulating sections being widely spaced from each other and terminals on said body adjacent said insulating sections for connecting said wave signal device to said body so that said body serves as an antenna for said device.

2. An antenna for a wave signal device installed in a vehicle comprising a body for said vehicle, said body being made of conducting material and being of such configuration that a pair of effective loop circuits are formed therein, said loop circuits being respectively disposed in intersecting planes displaced from each other by a substantial angle, insulating sections in said body placed in the paths of said loop circuits so that said circuits are electrically open, said insulating sections being widely spaced from each other, and means for connecting said wave signal device to the portions of said body adjacent said insulating sections.

3. An antenna for a wave signal receiver installed in a vehicle comprising a body for said vehicle, said body being made of conducting material and being of such configuration that a pair of effective loop circuits are formed therein, said loop circuits being respectively disposed in intersecting planes displaced from each other by an angle of the order of 45 degrees, insulating sections in said body placed in the paths of said loop circuits to form open loops, said insulating sections being widely spaced from each other, and means for connecting said wave signal receiver to the portions of said body adjacent said insulating sections so that the currents developed in said loops may be applied to said receiver.

4. In combination a mobile vehicle and a wave signal device installed therein, said vehicle including a metal body and a windshield, said metal body being adapted to serve as an antenna for said wave signal device and including a top and supports therefor which extend on either side of said windshield, insulating sections in said supports, and means for connecting said device to said body adjacent said insulating sections so that said metal body forms a loop antenna for said wave signal device.

5. An antenna for a wave signal device installed in an automobile comprising a metal body for said automobile, including a top and a pair of supports for said top, said metal body being of such configuration to form a pair of effective loop circuits which extend through said top supports, insulating sections in said top supports, and means for connecting said device to said circuits across said insulating sections.

6. In combination an automobile and a wave signal device installed therein, said automobile including a metal body and a windshield, said metal body being adapted to serve as an antenna for said wave signal device and including a top and supports therefor which extend on either side of said windshield, insulating sections in said supports, and means for connecting said device to said body adjacent said insulating sections so that a pair of effective loop circuits are formed in said metal body.

7. In combination an automobile and a wave signal device installed therein, said automobile including a metal body and a windshield, said metal body including a top and supports therefor which extend on either side of said windshield, said metal body being of such configuration that a pair of loop circuits are formed therein which extend through said supports, insulating sections in said supports, and terminals on said body adjacent said insulating sections for connecting said circuits to said wave signal device.

8. In combination an automobile and a wave signal device installed therein, said automobile including a metal body portion, a metal top integrally secured to said body portion, a windshield and insulating support members extending between said body portion and said top on either side of said windshield, terminals on said body portion and said top adjacent to said insulating support members, and means connecting said terminals to said wave signal device so that a pair of effective loop circuits are formed in said integral body portion and top which form an antenna for said device.

9. An antenna for a wave signal device installed in an automobile, such antenna comprising a metal body for said automobile, said body including a top and a plurality of supports for said top and being of such configuration as to form a plurality of effective loop circuits which extend respectively through said top supports, insulating sections respectively disposed in said top supports, and means for connecting the wave signal device to at least one of said loop circuits across any of said insulating sections.

10. An antenna for a wave signal device installed in an automobile, such antenna comprising a metal body for said automobile, said body including a top and a plurality of supports for said top and being of such configuration as to form a plurality of effective loop circuits which extend respectively through said top supports, at least one of said top supports having an insulating section therein, and means for coupling the wave signal device to said loop circuits, said means including taps on said body at opposite sides of said insulating section.

FRED B. WILLIAMS.
FRED P. HILL.

REFERENCES CITED

The following references are of record in the file of this patent:

UNITED STATES PATENTS

| Number | Name | Date |
|---|---|---|
| 1,997,271 | Zepler | Apr. 9, 1935 |
| 2,044,779 | Hanson | June 23, 1936 |
| 2,129,852 | Leib | Sept. 13, 1938 |
| 2,202,368 | Berndt | May 28, 1940 |
| 2,329,634 | McDonald | Sept. 14, 1943 |
| 2,353,111 | Davis | July 4, 1944 |
| 2,404,093 | Roberts | July 16, 1946 |